US012699688B2

(12) United States Patent
Zhou et al.

(10) Patent No.: US 12,699,688 B2
(45) Date of Patent: Aug. 4, 2026

(54) DATA PROCESSING METHOD, MEDIUM AND ELECTRONIC DEVICE FOR A DATABASE

(71) Applicant: Beijing Volcano Engine Technology Co., Ltd., Beijing (CN)

(72) Inventors: Dongyan Zhou, Beijing (CN); Liya Fan, Beijing (CN); Ruidong Li, Beijing (CN); Junda Zhao, Beijing (CN); Heng Chen, Beijing (CN); Rui Shi, Beijing (CN); Jianjun Chen, Los Angeles, CA (US)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/773,507

(22) Filed: Jul. 15, 2024

(65) Prior Publication Data

US 2025/0028709 A1 Jan. 23, 2025

(30) Foreign Application Priority Data

Jul. 20, 2023 (CN) .......................... 202310897430.7

(51) Int. Cl.
G06F 16/23 (2019.01)
(52) U.S. Cl.
CPC ................................ G06F 16/2379 (2019.01)
(58) Field of Classification Search
CPC ................................................ G06F 16/2379
(Continued)

(56) References Cited

U.S. PATENT DOCUMENTS

| 6,006,216 A | 12/1999 | Griffin et al. |
| 6,353,828 B1 | 3/2002 | Ganesh et al. |
| (Continued) | | |

FOREIGN PATENT DOCUMENTS

| CN | 104504158 A | 4/2015 |
| CN | 115391424 A | 11/2022 |
| CN | 115599871 A | 1/2023 |

OTHER PUBLICATIONS

European Patent Application No. 24189277.7; Extended Search Report; dated Feb. 14, 2025; 7 pages.

(Continued)

*Primary Examiner* — Amy Ng
*Assistant Examiner* — Antonio J Caiado
(74) *Attorney, Agent, or Firm* — BakerHostetler

(57) ABSTRACT

The present disclosure relates to a data processing method, a medium and an electronic device for a database. The method includes: obtaining a first execution statement for performing a target operation; reading, when a data source corresponding to the first execution statement includes first data corresponding to a committed transaction and second data corresponding to an uncommitted transaction, a materialized view obtained after performing the target operation on the first data as a target materialized view from a pre-created materialized view set; reading the second data and performing the target operation on the second data to obtain operation result data; performing data merging processing on the target materialized view and the operation result data to obtain merged data; and performing the target operation on the merged data to obtain an execution result corresponding to the first execution statement.

17 Claims, 3 Drawing Sheets

(58) Field of Classification Search
USPC .......................................................... 707/703
See application file for complete search history.

(56) References Cited

U.S. PATENT DOCUMENTS

| | | | |
|---|---|---|---|
| 9,400,815 B2 * | 7/2016 | Poppitz | G06F 16/24561 |
| 11,256,684 B1 * | 2/2022 | Papakonstantinou | |
| | | | G06F 16/2445 |
| 11,755,568 B1 * | 9/2023 | Akidau | G06F 16/24539 |
| | | | 707/717 |
| 2012/0047126 A1 * | 2/2012 | Branscome | G06F 16/24569 |
| | | | 707/713 |
| 2020/0081881 A1 * | 3/2020 | Garcia Tellez | G06F 16/2393 |
| 2020/0133937 A1 * | 4/2020 | Cruanes | G06F 16/2365 |
| 2020/0167424 A1 * | 5/2020 | Certain | G06F 16/2228 |
| 2020/0334254 A1 | 10/2020 | Arye et al. | |
| 2020/0364222 A1 * | 11/2020 | Sarapuk | G06F 16/24539 |
| 2021/0089529 A1 * | 3/2021 | Koppuravuri | G06F 16/2282 |
| 2021/0165783 A1 | 6/2021 | Deshpande et al. | |
| 2022/0245133 A1 * | 8/2022 | Li | G06F 16/2379 |
| 2023/0177049 A1 * | 6/2023 | Xu | G06F 16/24539 |
| | | | 707/717 |
| 2023/0289341 A1 * | 9/2023 | Kanne | G06F 16/2456 |
| 2023/0342355 A1 * | 10/2023 | Li | G06F 13/1673 |
| 2023/0350892 A1 * | 11/2023 | Haynes | G06F 16/24539 |
| 2025/0013638 A1 * | 1/2025 | Fan | G06F 16/24535 |

OTHER PUBLICATIONS

13 Data Concurrency and Consistency; https://docs.oracle.com/cd/
B13789_01/server.101/b10743/consist.htm; Oracle; © 1993; accessed
Apr. 30, 2025; 28 pages.
Oracle Database; https://en.wikipedia.org/wiki/Oracle_Database;
Wikipedia; accessed Apr. 30, 2025; 8 pages.
China Patent Application No. 202310897430.7; Office Action; dated
Aug. 8, 2025; 14 pages.

* cited by examiner

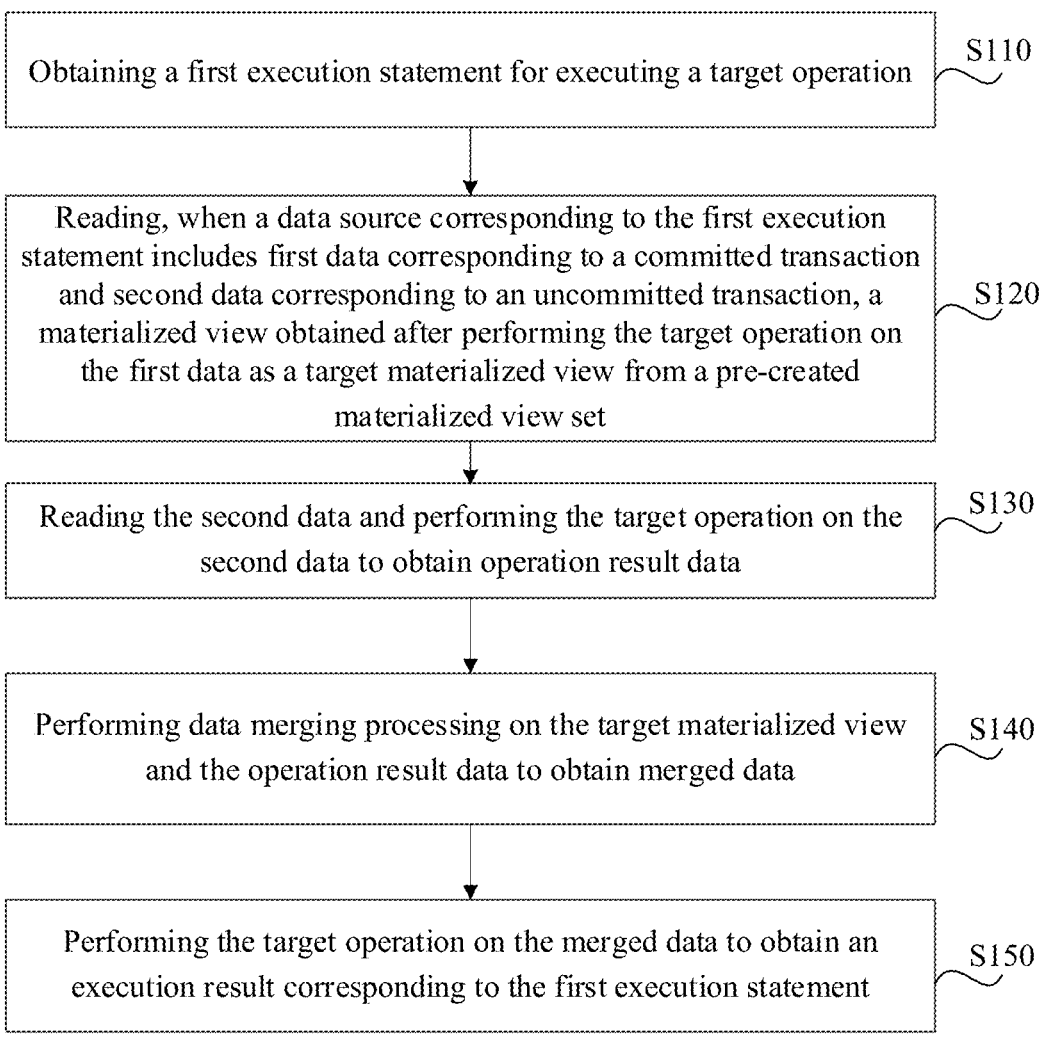

Obtaining a first execution statement for executing a target operation     S110

Reading, when a data source corresponding to the first execution statement includes first data corresponding to a committed transaction and second data corresponding to an uncommitted transaction, a materialized view obtained after performing the target operation on the first data as a target materialized view from a pre-created materialized view set     S120

Reading the second data and performing the target operation on the second data to obtain operation result data     S130

Performing data merging processing on the target materialized view and the operation result data to obtain merged data     S140

Performing the target operation on the merged data to obtain an execution result corresponding to the first execution statement     S150

FIG. 1

Second executing operator

Second merging operator

Third executing operator

First filtering operator

Second filtering operator

First scanning operator

First scanning operator

500

DATA PROCESSING METHOD, MEDIUM AND ELECTRONIC DEVICE FOR A DATABASE

CROSS-REFERENCE TO RELATED APPLICATION

This application claims priority to Chinese Patent Application No. 202310897430.7, filed on Jul. 20, 2023, which is hereby incorporated by reference in its entirety.

TECHNICAL FIELD

The present disclosure relates to the technical field of database, and specifically, to a data processing method, a medium and an electronic device for a database.

BACKGROUND

In order to meet extremely low query latency, a common practice in the industry is to use a materialized view (MV) to pre-aggregate detailed data, which can reduce the amount of data that needs to be processed for the original query.

However, the MV mechanism in related technologies is only applicable to the processing of the commit data of committed transactions and cannot be used for processing of some businesses in which it is necessary to process data of uncommitted transactions, thereby increasing the difficulty of querying.

SUMMARY

Summary is provided to introduce in a simplified form concepts that are further described in Detailed Description. Summary is not intended to identify key features or essential features of the claimed technical solution, nor is it intended to be used to limit the scope of the claimed technical solutions.

In a first aspect, the present disclosure provides a data processing method for a database, comprising operations of:

obtaining a first execution statement for performing a target operation;

reading, in response to a data source corresponding to the first execution statement comprising first data corresponding to a committed transaction and second data corresponding to an uncommitted transaction, a materialized view obtained after performing the target operation on the first data as a target materialized view from a pre-created materialized view set, wherein at least a materialized view obtained after performing a specified operation on any data is maintained in the pre-created materialized view set;

reading the second data and performing the target operation on the second data to obtain operation result data;

performing data merging processing on the target materialized view and the operation result data to obtain merged data; and performing the target operation on the merged data to obtain an execution result corresponding to the first execution statement.

In a second aspect, the present disclosure provides a computer-readable medium having a computer program stored thereon, wherein the computer program when executed by a processing device causes the processing device to implement a data processing method for a database described in the first aspect.

In a third aspect, the present disclosure provides an electronic device, comprising:

a storage device having a computer program stored thereon; and a processing device configured to execute the computer program in the storage device to implement a data processing method for a database described in the first aspect.

Other features and advantages of the present disclosure will be described in detail in the detailed description that follows.

BRIEF DESCRIPTION OF THE DRAWINGS

The above and other features, advantages, and aspects of various embodiments of the present disclosure will become more apparent with reference to the following detailed description taken in conjunction with the accompanying drawings. Throughout the drawings, the same or similar reference numbers refer to the same or similar elements. It is to be understood that the drawings are schematic, and that members and elements are not necessarily drawn to scale. In the attached drawings:

FIG. 1 is a flowchart of a data processing method for a database according to an exemplary embodiment of the present disclosure.

DETAILED DESCRIPTION

Figures 2, 3:
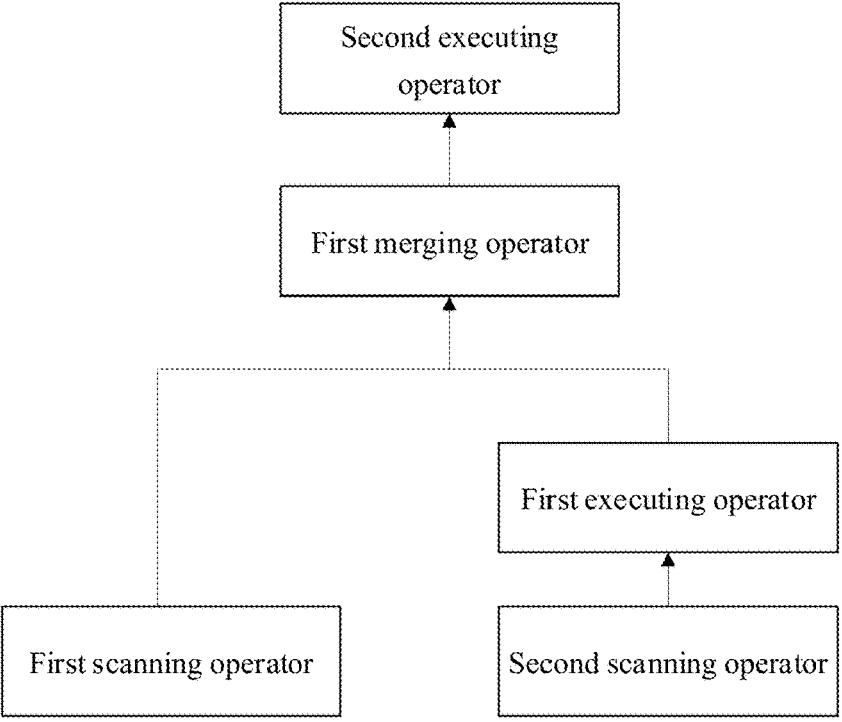
FIG. 2 is a tree diagram of an execution plan according to an exemplary embodiment of the present disclosure.
FIG. 3 is a tree diagram of another execution plan according to an exemplary embodiment of the present disclosure.

Embodiments of the present disclosure will be described in more detail below with reference to the accompanying drawings. Although certain embodiments of the present disclosure are shown in the drawings, it should be understood that the present disclosure may be embodied in various forms and should not be construed as limited to the embodiments set forth herein, which rather are provided for a more thorough and complete understanding of this disclosure. It should be understood that the drawings and embodiments of the present disclosure are for illustrative purposes only and are not intended to limit the scope of the present disclosure.

It should be understood that various steps described in the method implementations of the present disclosure may be executed in different orders and/or in parallel. Furthermore, method implementations may include additional steps and/or omit performance of illustrated steps. The scope of the present disclosure is not limited in this regard.

As used herein, the term "include" and its variations are open inclusion, i.e., "including but not limited to" The term "based on" means "based at least partially on". The term "one embodiment" means "at least one embodiment"; the term "another embodiment" means "at least one additional embodiment"; and the term "some embodiments" means "at least some embodiments". Relevant definitions of other terms will be given in the description below.

It should be noted that concepts such as "first" and "second" mentioned in this disclosure are only used to distinguish different devices, modules or units, and are not used to limit the order of functions performed by these devices, modules or units or interdependence of these devices, modules or units.

It should be noted that the modifications of "one" and "plurality" mentioned in this disclosure are illustrative and not restrictive, and those skilled in the art will understand that unless the context clearly indicates otherwise, it should be understood as "one or more".

The names of messages or information exchanged between multiple devices in the embodiments of the present disclosure are for illustrative purposes only and are not used to limit the scope of these messages or information.

It can be understood that before using the technical solutions provided in the embodiments of this disclosure, users should be informed of the type, scope of use, usage scenarios, etc. of the personal information involved in this disclosure in an appropriate manner in accordance with relevant laws and regulations, and the user's authorization should be obtained.

For example, in response to receiving an active request from a user, prompt information is sent to the user to clearly remind the user that the operation requested will require the acquisition and use of the user's personal information. Therefore, users may autonomously choose whether to provide personal information to software or hardware such as electronic devices, applications, servers or storage media that perform the operations of the technical solution of the present disclosure based on the prompt information.

As an optional but non-limiting implementation, in response to receiving the user's active request, the method of sending prompt information to the user may be, for example, a pop-up window, and the prompt information may be presented in the form of text in the pop-up window. In addition, the pop-up window can also contain a selection control for the user to choose "agree" or "disagree" to provide personal information to the electronic device.

It can be understood that the above process of notifying and obtaining user authorization is only illustrative and does not limit the implementation of the present disclosure. Other methods that satisfy relevant laws and regulations can also be applied to the implementation of the present disclosure.

At the same time, it can be understood that the data involved in this technical solution (including but not limited to the data itself, the acquisition or use of the data) should comply with the requirements of corresponding laws, regulations and relevant stipulations.

Many business scenarios such as online serving involve aggregation analysis of data within a certain time window, such as summation, sorting, averaging and other aggregation analysis operations. When the amount of data is relatively large, the processing is relatively slow and it is difficult to meet the needs of serving and other business scenarios that require extremely low query latency.

On the other hand, business scenarios such as serving have strict requirements on data timeliness. Some businesses need to read the data of uncommitted transactions. The data of uncommitted transactions corresponds to the lowest isolation level (Read Uncommitted) in the database, which requires the query engine to support dirty read.

In order to realize the extremely low query latency in business scenarios such as serving, a common practice in the industry is to use materialized views to pre-aggregate detailed data, which can reduce the amount of data that needs to be processed for the original query. The essence of the materialized view is a kind of pre-computation, which trades space for time, that is, the results of certain time-consuming operations (such as JOIN, AGGREGATE) are saved so as to be reused directly during queries to avoid these time-consuming operations and ultimately achieve acceleration of queries. The database optimizer will take advantage of the precomputed results of the materialized view and, if possible, only read increments from the MV's data source table to calculate the latest results.

The applicant found during long-term research that, the MV mechanism of the database system in the industry can ensure that the commit data of committed transactions is updated and synchronized into the MV in real time, which ensures that the data of the base table and MV is consistent under the isolation level of read commit. However, the data of uncommitted transactions will not be updated and synchronized into the MV. Therefore, the existing MV rewriting algorithm cannot rewrite the query in the dirty read scenario, and if it is forcibly rewritten, the data of uncommitted transactions will be lost, thereby returning incorrect results and affecting business decisions.

In some implementations, in scenarios such as serving of dirty read, the existing system needs to turn off MV rewriting. At this time, MV can no longer be used to optimize queries, and the system will be slower in processing when encountering queries with large amounts of data, and accordingly, the query delay is large and the real-time query requirements of services such as serving cannot be met.

To address this problem, embodiments of the present disclosure provide a data processing method, a storage medium and an electronic device for a database, so that the MV mechanism can be used to process execution statements even in dirty read scenarios to reduce query latency while ensuring data integrity and accuracy.

Referring to FIG. 1, FIG. 1 is a flowchart of a data processing method for a database according to an exemplary embodiment of the present disclosure. The data processing method for a database can be applied to an electronic device. Referring to FIG. 1, the data processing method for a database includes the following steps:

S110: obtaining a first execution statement for performing a target operation.

S120: reading, in response to a data source corresponding to the first execution statement including first data corresponding to a committed transaction and second data corresponding to an uncommitted transaction, a materialized view obtained after performing the target operation on the first data as a target materialized view from a pre-created materialized view set.

At least a materialized view obtained after performing a specified operation on any data is maintained in the materialized view set.

S130: reading the second data and performing the target operation on the second data to obtain operation result data.

S140: performing data merging processing on the target materialized view and the operation result data to obtain merged data.

S150: performing the target operation on the merged data to obtain an execution result corresponding to the first execution statement.

In embodiments of the present disclosure, the first execution statement may be a Structured Query Language (SQL) statement. Data in the data source may be accessed and processed through SQL statements.

In some implementations, the target operation may be an operation of processing based on multiple rows of data, that is, the target operation requires combination of multiple rows of data for analysis and processing. Optionally, the target operation may be Aggregate as an aggregating operation, Sort as a sorting operation, Limit as a limiting operation, etc. Optionally, aggregating operations may include, for example, average, number of items, maximum, minimum, summation, etc.

In some implementations, when it is necessary to perform the target operation on the first data corresponding to the committed transaction and the second data corresponding to the uncommitted transaction, the corresponding first execution statement could be edited, so that the electronic device may obtain and execute the first execution statement.

In some implementations, a specified operation may be performed on data in advance to obtain a materialized view. For example, a target operation may be performed on the first data in advance to obtain the target materialized view.

In some implementations, a materialized view set may be established in advance, and at least materialized views obtained after performing specified operations on any data are maintained in the materialized view set, which may include, for example, the aforementioned target materialized view.

By using the above approach, after obtaining the first execution statement for executing the target operation, a materialized view obtained after performing the target operation on the first data is read as a target materialized view from the pre-created materialized view set when the data source corresponding to the first execution statement includes the first data corresponding to the committed transaction and the second data corresponding to the uncommitted transaction; the second data is read and the target operation is performed on the read second data, so as to obtain operation result data; data merging is further performed on the target materialized view read and the operation result data to obtain the merged data; and then the target operation can be further performed on the merged data to obtain the execution result corresponding to the first execution statement. The entire data source is processed separately: for the first data part, the target operation is continually performed in the manner of the materialized view to reduce the query delay to a certain extent; and for the second data part, the target operation is first performed once to ensure the integrity of the query data, then the materialized view read is merged with the operation result data obtained after performing the target operation once, and the target operation is performed once again, thereby ensuring the accuracy of the finally obtained execution result. It can be seen that the above technical solution can reduce the query delay while ensuring integrity and accuracy of data.

Based on the foregoing content, it can be seen that for the first data part, the target operation may be continually performed in the manner of the materialized view. In this case, the materialized view needs to be created in advance. Therefore, in some implementations, the method of the embodiment of the present disclosure may further include the following steps of:

obtaining a second execution statement for creating the target materialized view, wherein a data source corresponding to the second execution statement is the first data; and in response to the second execution statement to generate the target materialized view performing the target operation on the first data.

In the embodiments of the present disclosure, the target materialized view may be created by performing the second execution statement.

In some implementations, the method of the embodiment of the present disclosure may further include the following step of:

determining that the data source corresponding to the first execution statement includes the first data and the second data, in response to determining that the first execution statement includes plan annotation information indicating that the data source includes the second data.

In the embodiments of the present disclosure, the plan annotation information may be understood as a plan hint, wherein the plan hint is an instruction passed to the optimizer through annotations in the SQL statement. The optimizer uses the plan hint to select an execution plan for the statement.

In this embodiment of the present disclosure, a plan hint may be added to the first execution statement to indicate by the plan hint that the data source includes the second data.

In addition, in some implementations, the first execution statement may correspond to the first data corresponding to the committed transaction by default. In this case, it is not necessary to indicate in the plan hint that the data source includes the first data. Therefore, when obtaining the first execution statement which includes plan annotation information indicating that the data source includes the second data, it can be determined that the data source corresponding to the first execution statement includes the first data and the second data.

Exemplarily, the plan hint used to indicate that the data source includes the second data may be represented by "/*+read_latest_data=true*/" added to the SQL statement.

In some embodiments, the plan hint may also be used to indicate that the data source includes the first data. In this case, the first execution statement includes plan annotation information indicating that the data source includes the first data and plan annotation information indicating that the data source includes the second data, it is determined that the data source corresponding to the first execution statement includes the first data and the second data.

In some implementations, the first execution statement includes execution scope information for filtering rows for which the target operation is performed. For example, the execution scope information may be: where a>18. In this case, it is necessary to limit the rows for which the target operation is performed. Therefore, in order to obtain accurate results, in step S130, performing the target operation on the second data to obtain the operation result data may include the following step of:

filtering the second data according to the execution scope information to obtain second filtered data; and performing the target operation on the second filtered data to obtain operation result data corresponding to the second filtered data.

Accordingly, in step S140, performing data merging processing on the target materialized view and the operation result data to obtain merged data may include the following steps of:

filtering the target materialized view according to the execution scope information to obtain first filtered data; and merging the first filtered data and the operation result data corresponding to the second filtered data to obtain the merged data.

In the embodiments of the present disclosure, when the target operation is directly performed on the read second data, the obtained operation result data does not consider the execution scope information, and the operation result data at this time is operation result data for all the second data.

Similarly, when the target operation is performed on the first data, the generated target materialized view is also a materialized view for all the first data.

Then, when the first execution statement includes execution scope information, if the target materialized view and the operation result data are directly merged to obtain the merged data and the target operation is performed on the merged data, the obtained execution result corresponding to the first execution statement is an execution result for all the first data and the second data without considering the execution scope information. Therefore, in order to ensure the accuracy of the execution results of the first execution statement including the execution scope information, in the embodiments of the present disclosure, the second data may be filtered according to the execution scope information to obtain the second filtered data, and then the target operation is performed on the second filtered data to obtain the operation result data corresponding to the second filtered data. At this time, the operation result data corresponding to the second filtered data corresponds to the second data limited by the execution scope information. Similarly, the target materialized view may also be filtered according to the execution scope information to obtain the first filtered data. At this time, the first filtered data corresponds to the materialized view of the first data limited by the execution scope information.

Finally, the first filtered data and the operation result data corresponding to the second filtered data that meet the requirements may be merged to obtain merged data, which may be further used to perform the target operation on the merged data.

In some embodiments, the procedure of the electronic device executing the SQL statement may include a procedure of rewriting the SQL statement into an execution plan, and further processing the rewritten execution plan.

In some implementations, the execution plan may include some operators with an execution order. By loading these operators according to the execution order, the execution result of the SQL statement can be obtained.

In this case, the method of the embodiment of the present disclosure may further include the following steps of:

constructing a first scanning operator for reading the target materialized view;

constructing a second scanning operator for reading the second data;

constructing a first executing operator for performing the target operation on the second data to obtain the operation result data;

constructing a first merging operator for merging the target materialized view and intermediate data to obtain the merged data; and constructing a second executing operator for performing the target operation on the merged data to obtain the execution result corresponding to the first execution statement.

In an embodiment of the present disclosure, when the electronic device determines that the data source corresponding to the first execution statement includes the first data corresponding to the committed transaction and the second data corresponding to the uncommitted transaction, the electronic device may respectively construct the first scanning operator, the second scanning operator, the first executing operator, the first merging operator and the second executing operator, then executes these operators based on the execution order, and the execution results corresponding to the first execution statement may be obtained based on the output of the second executing operator.

By executing the first scanning operator, the target materialized view may be read. By executing the second scanning operator, the second data may be read. By executing the first executing operator, the target operation may be performed on the second data to obtain operation result data. By executing the first merging operator, the target materialized view and the operation result data may be merged to obtain the merged data. By executing the second executing operator, the target operation may be performed on the merged data to obtain the execution result corresponding to the first execution statement.

Please refer to FIG. 2, which shows a schematic tree diagram of an execution plan according to an exemplary embodiment of the present disclosure.

As shown in FIG. 2, the execution plan includes a first scanning operator, a second scanning operator, a first executing operator, a first merging operator, and a second executing operator, wherein the input of the second executing operator is the output of the first merging operator, the input of the first merging operator includes the output of the first scanning operator and the output of the first executing operator, and the input of the first executing operator is the output of the second scanning operator.

The functions of respective operators in FIG. 2 have been described above and will not be described again here.

In addition, based on the foregoing content, it can be known that in some implementations, the first execution statement includes execution scope information. In this case, the method according to the embodiment of the present disclosure may further include the following steps of:

constructing a first filtering operator for filtering the target materialized view according to the execution scope information to obtain first filtered data;

constructing a second filtering operator for filtering the second data according to the execution scope information to obtain second filtered data;

constructing a third executing operator for performing the target operation on the second filtered data to obtain the operation result data corresponding to the second filtered data; and constructing a second merging operator for merging the first filtered data and the operation result data corresponding to the second filtered data to obtain the merged data.

In the embodiments of the present disclosure, the electronic device may further construct a first filtering operator, a second filtering operator, a third executing operator, and a second merging operator. By executing the first filtering operator, the target materialized view may be filtered according to the execution scope information to obtain the first filtered data. By executing the second filtering operator, the second data may be filtered according to the execution scope information to obtain the second filtered data. By executing the third executing operator, the target operation may be performed on the second filtered data to obtain operation result data corresponding to the second filtered data. By executing the second merging operator, the first filtered data and the operation result data corresponding to the second filtered data are merged to obtain the merged data.

Please refer to FIG. 3, which shows a tree diagram of another execution plan according to an exemplary embodiment of the present disclosure.

As shown in FIG. 3, the execution plan includes a first scanning operator, a first filtering operator, a second scanning operator, a second filtering operator, a third executing operator, a second merging operator, and a second executing operator, wherein the input of the second executing operator is the output of the second merging operator, the input of the second merging operator includes the output of the first filtering operator and the output of the third executing operator, the input of the first filtering operator is the output of the first scanning operator, the input of the third executing operator are the output of the second filtering operator, and the input of the second filtering operator is the output of the second scanning operator.

The functions of respective operators in FIG. 3 have been described above and will not be described again here.

In some implementations, the procedure of constructing the operator may be performed by the optimizer, and the procedure of loading and executing the operator may be performed by the actuator.

Next, the data processing method for a database according to the embodiment of the present disclosure will be described in detail with a complete example:

In this example, the first execution statement is assumed to be an execution statement used to perform a summation operation on parameter b in data with parameter a>18 in the data source. The data source of the execution statement includes the first data corresponding to the committed transaction and the second data corresponding to the uncommitted transaction. In the embodiments of the present disclosure, the following SQL statement may be written:

SQL
/*+read_latest_data=true*/select
a, sum (b)
from tbl
where a>18
group by a;

Moreover, the target materialized view may be created in advance based on the following second execution statement:

SQL
create materialized view mv as
select a, sum (b)
from tbl
group by a

After obtaining the first execution statement, the optimizer may determine according to the plan annotation information that the data source corresponding to the first execution statement includes first data and second data, then the optimizer may rewrite the first execution statement. The rewriting process is as follows:

constructing a first scanning (scan) operator for reading the target materialized view;

constructing a second scanning (scan) operator for reading the second data;

constructing a first filtering (filter) operator for filtering the first data with a>18 from the data of the target materialized view;

constructing a second filtering (filter) operator for filtering the second filtered data with a>18 from the second data;

constructing a third executing (aggregate) operator for performing a summation operation on the second filtered data to obtain the operation result data corresponding to the second filtered data;

constructing a second merging (union) operator for merging the first filtered data and the operation result data corresponding to the second filtered data to obtain the merged data; and constructing a second executing (aggregate) operator that is used to perform a target operation on the merged data to obtain the execution result corresponding to the first execution statement.

Finally, the actuator may can execute each operator in sequence according to the execution order to obtain the execution result corresponding to the first execution statement. It can be seen that since the materialized view is used to process the first data, the query delay can be reduced to a certain extent, and the second data is also filtered and summed to ensure the integrity of the query data. Finally, the data of the read materialized view and the obtained intermediate data are merged and then a summation operation is performed once again to ensure the accuracy of the execution result finally obtained.

Figures 4, 5:
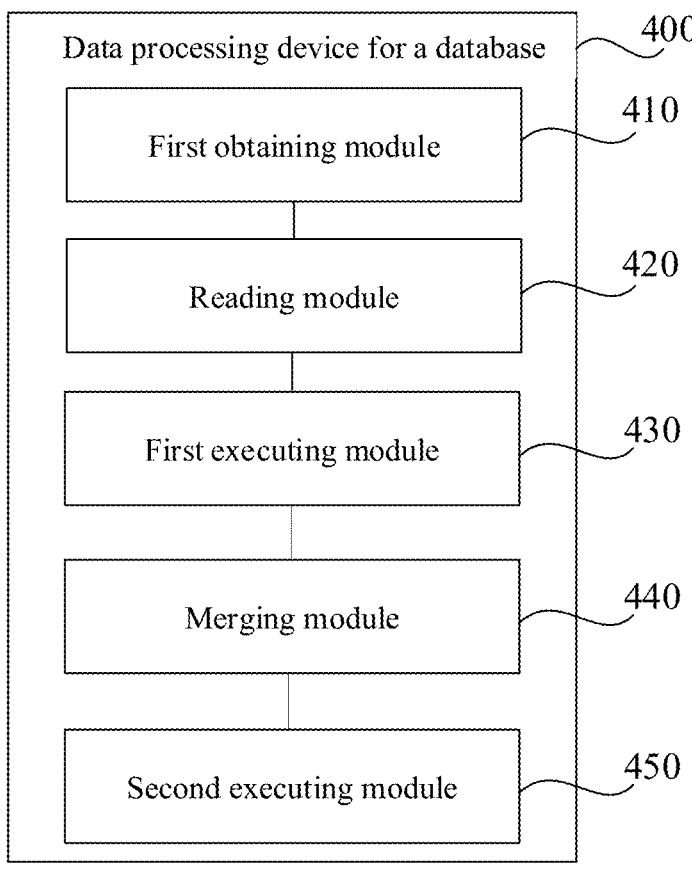
FIG. 4 is a block diagram of a data processing apparatus for a database according to an exemplary embodiment of the present disclosure.
FIG. 5 is a structural diagram of an electronic device according to an exemplary embodiment of the present disclosure.

FIG. 4 is a block diagram of a data processing apparatus for a database according to an exemplary embodiment of the present disclosure. Referring to FIG. 4, the data processing device 400 for a database includes:

a first obtaining module 410, which is configured to obtain a first execution statement for performing a target operation;

a reading module 420, which is configured to read, in response to a data source corresponding to the first execution statement including first data corresponding to a committed transaction and second data corresponding to an uncommitted transaction, a materialized view obtained after performing the target operation on the first data as a target materialized view from a pre-created materialized view set, wherein at least a materialized view obtained after performing a specified operation on any data is maintained in the materialized view set;

a first execution module 430, which is configured to read the second data and perform the target operation on the second data to obtain operation result data;

a merging module 440, which is configured to perform data merging processing on the target materialized view and the operation result data to obtain merged data;

a second execution module 450, which is configured to perform the target operation on the merged data to obtain an execution result corresponding to the first execution statement.

Optionally, the device 400 further includes:

a determination module, which is configured to determine that the data source corresponding to the first execution statement includes the first data and the second data, in response to determining that the first execution statement includes plan annotation information indicating that the data source includes the second data.

Optionally, the device 400 further includes:

a first constructing module, which is configured to: construct a first scanning operator for reading the target materialized view; construct a second scanning operator for reading the second data; construct a first executing operator for performing the target operation on the second data to obtain the operation result data; construct a first merging operator for merging the target materialized view and the operation result data to obtain the merged data; and construct a second executing operator for performing the target operation on the merged data to obtain the execution result corresponding to the first execution statement.

Optionally, the first execution statement includes execution scope information, and the first execution module 430 includes:

a first filter sub-module, which is configured to filter the second data according to the execution scope information to obtain second filtered data; and a first execution sub-module, which is configured to perform the target operation on the second filtered data to obtain operation result data corresponding to the second filtered data.

Accordingly, the merging module 440 includes:

a second filter sub-module, which is configured to filter the target materialized view according to the execution scope information to obtain the first filtered data; and a merging sub-module, which is configured to merge the first filtered data and the operation result data corresponding to the second filtered data to obtain the merged data.

Optionally, the device 400 further includes:

a second constructing module, which is configured to: construct a first filtering operator for filtering the target materialized view according to the execution scope information to obtain the first filtered data; construct a second filtering operator for filtering the second data according to the execution scope information to obtain the second filtered data; construct a third executing operator for performing the target operation on the second filtered data to obtain the operation result data corresponding to the second filtered data; and construct a second merging operator for merging the first filtered data and the operation result data corresponding to the second filtered data to obtain the merged data.

Optionally, the device 400 further includes:

a second obtaining module, which is configured to obtain a second execution statement for creating the target materialized view, wherein a data source corresponding to the second execution statement is the first data; and a response module, which is configured to perform the target operation on the first data in response to the second execution statement to generate the target materialized view.

Optionally, the target operation is an operation of processing based on multiple rows of data.

Referring now to FIG. 5, a structural diagram of an electronic device 500 suitable for implementing embodiments of the present disclosure is shown. The electronic device shown in FIG. 5 is only an example and should not impose any limitations on the functions and use scope of the embodiments of the present disclosure.

As shown in FIG. 5, the electronic device 500 may include a processing device (e.g., a central processing unit, a graphics processor, etc.) 501, which may execute various appropriate actions and processes according to a program stored in a read-only memory (ROM) 502 or a program loaded from a storage device 508 into a random-access memory (RAM) 503. In the RAM 503, various programs and data required for the operation of the electronic device 500 are also stored. The processing device 501, the ROM 502 and the RAM 503 are connected to each other via a bus 504. An input/output (I/O) interface 505 is also connected to the bus 504.

Generally, the following devices may be connected to the I/O interface 505: input devices 506 including, for example, a touch screen, touch pad, keyboard, mouse, camera, microphone, accelerometer, gyroscope, etc.; output devices 507 including, for example, a liquid crystal display (LCD), speakers, vibration, etc.; a storage device 508 including, for example, a magnetic tape, a hard disk, etc., and a communication device 509. The communication device 509 may allow the electronic device 500 to communicate wirelessly or wiredly with other devices to exchange data. Although FIG. 5 illustrates the electronic device 500 with various means, it should be understood that implementation or availability of all illustrated means is not required. More or fewer means may alternatively be implemented or provided.

In particular, according to embodiments of the present disclosure, the processes described above with reference to the flowcharts may be implemented as computer software programs. For example, embodiments of the present disclosure include a computer program product including a computer program carried on a non-transitory computer-readable medium, the computer program containing program code for performing the method illustrated in the flowchart. In such embodiments, the computer program may be downloaded and installed from the network via the communication device 509, or installed from the storage device 508, or installed from the ROM 502. When the computer program is executed by the processing device 501, the above-mentioned functions defined in the method according to the embodiment of the present disclosure are performed.

It should be noted that the computer-readable medium mentioned above in the present disclosure may be a computer-readable signal medium or a computer-readable storage medium, or any combination of the above two media. The computer-readable storage medium may be, for example, but is not limited to, an electrical, magnetic, optical, electromagnetic, infrared, or semiconductor system, apparatus or device, or any combination thereof. More specific examples of computer readable storage media may include, but are not limited to: an electrical connection having one or more wires, a portable computer disk, a hard drive, random access memory (RAM), read only memory (ROM), erasable programmed read-only memory (EPROM or flash memory), fiber optics, portable compact disk read-only memory (CD-ROM), optical storage device, magnetic storage device, or any suitable combination of the above media. In this disclosure, a computer-readable storage medium may be any tangible medium that contains or stores a program for use by or in connection with an instruction execution system, apparatus, or device. In the present disclosure, a computer-readable signal medium may include a data signal propagated in baseband or as part of a carrier wave, carrying computer-readable program code therein. Such propagated data signals may take a variety of forms, including but not limited to electromagnetic signals, optical signals, or any suitable combination of the above signals. A computer-readable signal medium may also be any computer-readable medium other than a computer-readable storage medium that can send, propagate, or transmit a program for use by or in connection with an instruction execution system, apparatus, or device. Program code embodied on a computer-readable medium may be transmitted using any suitable medium, including but not limited to: wire, optical cable, radio frequency (RF), etc., or any suitable combination of the above media.

In some embodiments, electronic devices can communicate using any currently known or future developed network protocol, such as HyperText Transfer Protocol (HTTP), and can communicate and interconnect with digital data in any form or medium (For example, communication network). Examples of communication networks include local area networks ("LAN"), wide area networks ("WAN"), the network of network (e.g., the Internet), and peer-to-peer networks (e.g., ad hoc peer-to-peer networks), as well as any currently known or future developed network.

The above-mentioned computer-readable medium may be included in the above-mentioned electronic device, or it may exist independently without being assembled into the electronic device.

The computer-readable medium has one or more programs stored thereon. The one or more programs, when executed by the electronic device, causes the electronic device to: obtain a first execution statement for performing a target operation; read, in response to a data source corresponding to the first execution statement including first data corresponding to a committed transaction and second data corresponding to an uncommitted transaction, a materialized view obtained after performing the target operation on the first data from a pre-created materialized view set as a target materialized view, wherein at least a materialized view obtained after performing a specified operation on any data is maintained in the materialized view set; read the second data and performing the target operation on the second data to obtain operation result data; perform data merging processing on the target materialized view and the operation result data to obtain merged data; and perform the target operation on the merged data to obtain an execution result corresponding to the first execution statement.

Computer program code for performing the operations of the present disclosure may be written in one or more programming languages or combination thereof, including but not limited to object-oriented programming languages—such as Java, Smalltalk, C++, and including conventional procedural programming languages—such as "C" or similar programming languages. The program code may be executed entirely or partly on the user's computer, executed as a stand-alone software package, executed partly on the user's computer and partly on a remote computer, or executed entirely on the remote computer or server. In situations involving remote computers, the remote computer can be connected to the user's computer through any kind of network, including a local area network (LAN) or a wide area network (WAN), or it can be connected to an external computer (such as connected via the Internet through an Internet service provider).

The flowcharts and block diagrams in the figures illustrate the architecture, functionality, and operations of possible implementations of systems, methods, and computer program products according to various embodiments of the present disclosure. In this regard, each block in the flowchart or block diagram may represent a module, a program segment, or a portion of code that contains one or more executable instructions for implementing specified logic functions. It should also be noted that, in some alternative implementations, the functions noted in the block may occur out of the order noted in the figures. For example, two blocks shown one after another may actually be executed substantially in parallel, or they may sometimes be executed in the reverse order, depending on the functionality involved. It will also be noted that each block of the block diagram and/or flowchart, and combinations of blocks in the block diagram and/or flowchart, can be implemented by special purpose hardware-based systems that perform specified functions or operations, or can be implemented by using a combination of specialized hardware and computer instructions.

The modules involved in the embodiments of the present disclosure can be implemented in software or hardware, wherein the name of the module does not constitute a limitation on the module itself under certain circumstances.

The functions described above herein may be performed, at least in part, by one or more hardware logic components. For example, and without limitation, exemplary types of available hardware logic components include: Field Programmable Gate Arrays (FPGAs), Application Specific Integrated Circuits (ASICs), Application Specific Standard Products (ASSPs), Systems on Chips (SOCs), Complex Programmable Logical device (CPLD) and so on.

In the context of this disclosure, a machine-readable medium may be a tangible medium that may contain or store a program for use by or in connection with an instruction execution system, apparatus, or device. The machine-readable medium may be a machine-readable signal medium or a machine-readable storage medium. Machine-readable media may include, but are not limited to, electronic, magnetic, optical, electromagnetic, infrared, or semiconductor systems, devices or apparatuses, or any suitable combination of these media. More specific examples of machine-readable storage media would include one or more wire-based electrical connections, portable computer disks, hard drives, random access memory (RAM), read only memory (ROM), erasable programmable read only memory (EPROM or flash memory), optical fiber, portable compact disk read-only memory (CD-ROM), optical storage device, magnetic storage device, or any suitable combination of the above media.

The above description is only a description of the preferred embodiments of the present disclosure and the technical principles applied. Those skilled in the art should understand that the present disclosure scope involved in the present disclosure is not limited to technical solutions composed of specific combinations of the above technical features, but should also cover other technical solutions formed by any combination of above technical features or equivalent features thereof without departing from the above disclosed concept, for example, a technical solution formed by replacing the above features by technical features with similar functions provided in this disclosure (but not limited to these features).

Furthermore, although operations are depicted in a specific order, this should not be understood as requiring that these operations be performed in the specific order shown or performed in a sequential order. Under certain circumstances, multitasking and parallel processing may be advantageous. Likewise, although several specific implementation details are included in the above discussion, these should not be construed as limiting the scope of the present disclosure. Certain features that are described in the context of separate embodiments can also be implemented in combination in a single embodiment. Conversely, various features that are described in the context of a single embodiment can also be implemented in multiple embodiments separately or in any suitable sub-combination.

Although the subject matter has been described in language specific to structural features and/or methodological acts, it is to be understood that the subject matter defined in the appended claims is not necessarily limited to the specific features or acts described above. Rather, the specific features and acts described above are merely example forms of implementing the claims. Regarding the devices in the above embodiments, the specific manner in which each module performs operations has been described in detail in the embodiments related to the method and will not be described in detail here.

What is claimed is:

1. A method for executing Structured Query Language (SQL) statements of a database by a processing device to implement real-time queries and ensure accuracy of query results, comprising:

obtaining an SQL statement for performing a target operation in the database, wherein the SQL statement comprises an annotation indicating that the SQL statement includes both committed data stored in the database and uncommitted data stored in the database;

loading a first operator to read a target materialized view corresponding to the committed data as a first result associated with the SQL statement, wherein the target materialized view was pre-created based on previously performing the target operation on the committed data, and wherein reading the target materialized view instead of re-performing the target operation on the committed data reduces a query delay;

loading at least one second operator to read the uncommitted data from the database and perform the target operation for a first time on the uncommitted data to obtain a second result associated with the SQL statement, thereby ensuring an integrity of data queried by the SQL statement;

loading a third operator to perform data merging processing on the first result associated with the SQL statement and the second result associated with the SQL statement to obtain merged data; and executing the SQL statement by the processing device performing the target operation for a second time on the merged data to ensure an accuracy of a final result of executing the SQL statement.

2. The method according to claim 1, wherein the at least one second operator comprises a scanning operator and a first executing operator, the method further comprising:

constructing the first operator for reading the target materialized view;

constructing the scanning operator for reading the second data;

constructing the first executing operator for performing the target operation on the second data to obtain the second result;

constructing the third operator for performing data merging processing on the target materialized view and the second result to obtain the merged data; and constructing a second executing operator for performing the target operation for the second time on the merged data to obtain the final result of executing the SQL statement.

3. The method according to claim 1, wherein the SQL statement comprises execution scope information, and performing the target operation for the first time on the uncommitted data to obtain the second result associated with the SQL statement comprises:

filtering the uncommitted data according to the execution scope information to obtain filtered uncommitted data; and performing the target operation on the filtered uncommitted data to obtain the second result; and performing the data merging processing on the first result associated with the SQL statement and the second result associated with the SQL statement to obtain the merged data comprises:

filtering the first result according to the execution scope information to obtain filtered committed data; and merging the filtered committed data and the second result to obtain the merged data.

4. The method according to claim 3, further comprising:

constructing a first filtering operator for filtering the first result according to the execution scope information to obtain the filtered committed data;

constructing a second filtering operator for filtering the uncommitted data according to the execution scope information to obtain the filtered uncommitted data;

constructing a third executing operator for performing the target operation on the filtered uncommitted data to obtain the second result; and constructing a second merging operator for merging the filtered committed data and the second result to obtain the merged data.

5. The method according to claim 1, further comprising:

obtaining a second execution statement for creating the target materialized view, wherein a data source corresponding to the second execution statement is the committed data; and in response to the second execution statement, performing the target operation on the committed data to generate the target materialized view.

6. The method according to claim 1, wherein the target operation is an operation of processing based on multiple rows of data.

7. A non-transitory computer-readable medium having a computer program stored thereon, wherein the computer program when executed by a processing device causes the processing device to implement operations for executing Structured Query Language (SQL) statements of a database by a processing device to implement real-time queries and ensure accuracy of query results, the operations comprising:

obtaining an SQL statement for performing a target operation in the database, wherein the SQL statement comprises an annotation indicating that the SQL statement includes both committed data stored in the database and uncommitted data stored in the database;

loading a first operator to read a target materialized view corresponding to the committed data as a first result associated with the SQL statement, wherein the target materialized view was pre-created based on previously performing the target operation on the committed data, and wherein reading the target materialized view instead of re-performing the target operation on the committed data reduces a query delay;

loading a second operator to read the uncommitted data from the database and perform the target operation for a first time on the uncommitted data to obtain a second result associated with the SQL statement, thereby ensuring an integrity of data queried by the SQL statement;

loading a third operator to perform data merging processing on the first result associated with the SQL statement and the second result associated with the SQL statement to obtain merged data; and executing the SQL statement by the processing device performing the target operation for a second time on the merged data to ensure an accuracy of a final result of executing the SQL statement.

8. The non-transitory computer-readable medium according to claim 7, wherein the at least one second operator comprises a scanning operator and a first executing operator, and wherein the operations further comprise:

constructing the first operator for reading the target materialized view;

constructing the scanning operator for reading the second data;

constructing the first executing operator for performing the target operation on the second data to obtain the second result;

constructing the third operator for performing data merging processing on the target materialized view and the second result to obtain the merged data; and constructing a second executing operator for performing the target operation for the second time on the merged data to obtain the final result of executing the SQL statement.

9. The non-transitory computer-readable medium according to claim 7, wherein the SQL statement comprises execution scope information, and performing the target operation for the first time on the uncommitted data to obtain the second associated with the SQL statement comprises:

filtering the uncommitted data according to the execution scope information to obtain filtered uncommitted data; and performing the target operation on the filtered uncommitted data to obtain the second result; and performing the data merging processing on the first result associated with the SQL statement and the second result associated with the SQL statement to obtain the merged data comprises:

filtering the first result according to the execution scope information to obtain filtered committed data; and merging the filtered committed data and the second result to obtain the merged data.

10. The non-transitory computer-readable medium according to claim 9, wherein the operations further comprise:

constructing a first filtering operator for filtering the first result according to the execution scope information to obtain the filtered committed data;

constructing a second filtering operator for filtering the uncommitted data according to the execution scope information to obtain the filtered uncommitted data;

constructing a third executing operator for performing the target operation on the filtered uncommitted data to obtain the second result; and constructing a second merging operator for merging the first filtered committed data and the second result to obtain the merged data.

11. The non-transitory computer-readable medium according to claim 7, wherein the operations further comprise:

obtaining a second execution statement for creating the target materialized view, wherein a data source corresponding to the second execution statement is the committed data; and in response to the second execution statement, performing the target operation on the committed data to generate the target materialized view.

12. The non-transitory computer-readable medium according to claim 7, wherein the target operation is an operation of processing based on multiple rows of data.

13. An electronic device, comprising:

a storage device having a computer program stored thereon; and a processing device configured to execute the computer program in the storage device to implement operations for executing Structured Query Language (SQL) statements of a database by a processing device to implement real-time queries and ensure accuracy of query results, the operations comprising:

obtaining an SQL statement for performing a target operation in the database, wherein the SQL statement comprises an annotation indicating that the SQL statement includes both committed data stored in the database and uncommitted data stored in the database;

loading a first operator to read a target materialized view corresponding to the committed data as a first result associated with the SQL statement, wherein the target materialized view was pre-created based on previously performing the target operation on the committed data, and wherein reading the target materialized view instead of re-performing the target operation on the committed data reduces a query delay;

loading a second operator to read the uncommitted data from the database and perform the target operation for a first time on the uncommitted data to obtain a second result associated with the SQL statement, thereby ensuring an integrity of data queried by the SQL statement;

loading a third operator to perform data merging processing on the first result associated with the SQL statement and the second result associated with the SQL statement to obtain merged data; and executing the SQL statement by the processing device performing the target operation for a second time on the merged data to ensure an accuracy of a final result of executing the SQL statement.

14. The electronic device according to claim 13, wherein the at least one second operator comprises a scanning operator and a first executing operator, and wherein the operations further comprise:

constructing the first operator for reading the target materialized view;

constructing the scanning operator for reading the second data;

constructing the first executing operator for performing the target operation on the second data to obtain the second result;

constructing the third operator for performing data merging processing on the target materialized view and the second result to obtain the merged data; and constructing a second executing operator for performing the target operation for the second time on the merged data to obtain the final result of executing the SQL statement.

15. The electronic device according to claim 13, wherein the SQL statement comprises execution scope information, and performing the target operation for the first time on the uncommitted data to obtain the second associated with the SQL statement comprises:

filtering the uncommitted data according to the execution scope information to obtain filtered uncommitted data; and performing the target operation on the filtered uncommitted data to obtain the second result; and performing the data merging processing on the first result associated with the SQL statement and the second result associated with the SQL statement to obtain the merged data comprises:

filtering the first result according to the execution scope information to obtain filtered committed data; and merging the filtered committed data and the second result to obtain the merged data.

16. The electronic device according to claim 13, wherein the operations further comprise:

constructing a first filtering operator for filtering the first result according to the execution scope information to obtain the filtered committed data;

constructing a second filtering operator for filtering the uncommitted data according to the execution scope information to obtain the filtered uncommitted data;

constructing a third executing operator for performing the target operation on the filtered uncommitted data to obtain the second result; and constructing a second merging operator for merging the filtered committed data and the second result to obtain the merged data.

17. The electronic device according to claim 13, wherein the operations further comprise:

obtaining a second execution statement for creating the target materialized view, wherein a data source corresponding to the second execution statement is the committed data; and in response to the second execution statement, performing the target operation on the committed data to generate the target materialized view.

<div align="center">* * * * *</div>